United States Patent [19]

Osman et al.

[11] Patent Number: 4,592,903
[45] Date of Patent: Jun. 3, 1986

[54] LOW SEVERITY HYDROCARBON STEAM REFORMING PROCESS

[75] Inventors: Robert M. Osman, Parsippany; Robert G. Byington, Flanders, both of N.J.

[73] Assignee: Exxon Research & Engineering Co., Florham Park, N.J.

[21] Appl. No.: 701,120

[22] Filed: Feb. 13, 1985

Related U.S. Application Data

[63] Continuation of Ser. No. 550,553, Nov. 10, 1983, abandoned.

[51] Int. Cl.$^4$ .......................... C01C 1/04; C01B 3/26; C07C 1/02
[52] U.S. Cl. .................................. 423/359; 423/352; 423/362; 423/652; 252/374; 252/376
[58] Field of Search ............................. 423/359-362, 423/352, 652; 252/373, 376, 374

[56] References Cited

U.S. PATENT DOCUMENTS

| | | | |
|---|---|---|---|
| 1,952,909 | 3/1934 | Davis | 423/359 |
| 3,081,268 | 3/1963 | Marshall, Jr. | 252/376 |
| 3,388,968 | 6/1968 | Spielman et al. | 423/260 |

(List continued on next page.)

FOREIGN PATENT DOCUMENTS

| | | | |
|---|---|---|---|
| 49967 | 9/1981 | European Pat. Off. | |
| 86383 | 12/1971 | Fed. Rep. of Germany | 423/360 |

(List continued on next page.)

OTHER PUBLICATIONS

"Doing What the Jumbo Jet Did," *ICI Magazine*, pp. 66–69 (dated on its face Autumn 1983).
B. J. Grotz, *Hydrocarbon Processing*, vol. 46, No. 4, pp. 197–202 (Apr. 1967).

(List continued on next page.)

*Primary Examiner*—Donald R. Valentine
*Attorney, Agent, or Firm*—Jack B. Murray, Jr.

[57] ABSTRACT

In a process for producing ammonia which comprises: (a) primary catalytically reforming at super atmospheric pressure in a direct-fired primary reforming zone, a hydrocarbon feedstock with steam to produce a gas containing carbon oxides, hydrogen and methane; (b) secondary catalytically reforming the gas from step (a) by introducing air and bringing the mixture towards equilibrium thereby producing a secondary reformer effluent gas containing nitrogen, carbon oxides, hydrogen and a decreased quantity of methane; (c) converting carbon monoxide catalytically with steam to carbon dioxide and hydrogen; (d) removing carbon oxides to give an ammonia synthesis gas comprising nitrogen and hydrogen and compressing the gas to ammonia synthesis pressure; (e) reacting the synthesis gas in an ammonia synthesis zone to produce ammonia and recovering ammonia from the reacted gas to produce an ammonia-depleted gas stream; (f) recycling at least a portion of the ammonia-depleted gas stream to the ammonia synthesis zone; and (g) treating a sidestream of the ammonia-depleted gas to separate a stream enriched in hydrogen and an inerts-enriched gas stream, and returning the enriched hydrogen stream to the ammonia synthesis zone; the improvement which comprises: (i) operating step (b) at a temperature in the outlet gas of not greater than about 1735° F. and with an amount of air sufficient to provide from about 3 to 11 molar % excess $N_2$ and to form a secondary reformer outlet gas containing at least 0.8 vol. % methane; (ii) operating step (e) under conditions sufficient to provide at least 10 vol. % inert gases in the ammonia-depleted gas stream; and (iii) introducing as synthesis gas feed to the ammonia synthesis zone a mixture comprising the synthesis gas formed in step (d) having a methane content of at least about 1.2 mol. % $CH_4$, on a dry basis, the recycled gas produced in step (f) plus the hydrogen-enriched gas stream formed in step (g), whereby the $H_2$ loss from the process with the separated inerts enriched gas stream is minimized.

8 Claims, 1 Drawing Figure

U.S. PATENT DOCUMENTS

| | | | |
|---|---|---|---|
| 3,441,393 | 4/1969 | Finneran et al. | 48/197 |
| 3,442,613 | 5/1969 | Grotz, Jr. | 23/199 |
| 3,649,558 | 3/1972 | Linde et al. | 252/376 |
| 3,947,551 | 3/1976 | Parrish | 423/359 |
| 4,056,603 | 11/1977 | Bresler | 423/359 |
| 4,213,954 | 7/1980 | Pinto | 423/359 |
| 4,264,567 | 4/1981 | Pinto | 423/359 |
| 4,298,588 | 11/1981 | Pinto | 423/359 |
| 4,312,851 | 1/1982 | Isalski et al. | 423/359 |
| 4,315,900 | 2/1982 | Nozawa et al. | 423/359 |

FOREIGN PATENT DOCUMENTS

| | | |
|---|---|---|
| 1057020 | 12/1965 | United Kingdom . |
| 1156002 | 6/1966 | United Kingdom . |
| 1156003 | 6/1966 | United Kingdom . |
| 1274504 | 9/1969 | United Kingdom . |
| 1460681 | 2/1975 | United Kingdom . |
| 2030973A | 10/1978 | United Kingdom . |
| 2017071A | 3/1979 | United Kingdom . |
| 486667 | 6/1973 | U.S.S.R. . |

OTHER PUBLICATIONS

Kirk-Othmer, *Encyclopedia of Chemical Technology*, 3d Edition, vol. 2, pp. 492–494 (1978).

B. J. Grotz, *Nitrogen*, vol. 100, pp. 71–75 (1976).

R. Banks, *Chem Eng.*, pp. 90–92 (Oct. 10, 1977).

A. Haslam et al., *Hydrocarbon Processing*, pp. 103–106, Jan. 1976.

K. S. Chari, *Chem. Age India*, pp. 283–285 (Apr. 1978).

T. Matsuoka, *Chem Age India*, vol. 30, No. 2, pp. 119–128 (Feb. 1979).

R. L. Shaner, *Chem. Eng. Prog.*, pp. 47–52, May 1978.

J. G. Livingstone & A. Pinto, "New Ammonia Process Reduces Costs," *AIChe Ammonia Safety Symposium Proceedings*, Paper 123f, (Nov. 14–18, 1982, Los Angeles, California).

F. C. Brown, "Ammonia Plant Preferences in the 1980's," *The Fertiliser Society*, indicated to have been read before the Fertiliser Society of London on Oct. 19, 1983 (16 pages).

J. G. Livingstone & A. Pinto, "Solve Ammonia Plant Problems with the AMV Process," indicated to have been presented at Fertiliser '83 International Conference, London, England, Nov. 13–16, 1983.

Frank C. Brown, "Ammonia Plants New or Make New," *Humphreys & Glasgow Limited* brochure (undated) (17 pages).

LOW SEVERITY HYDROCARBON STEAM REFORMING PROCESS

CROSS-REFERENCE TO RELATED APPLICATION

This is a continuation of application Ser. No. 550,553, filed Nov. 10, 1983, now abandoned.

This application is related to application Ser. No. 550,552 filed Nov. 10, 1983, now U.S. Pat. No. 4,545,976.

BACKGROUND OF THE INVENTION

1. Field of the Invention

The present invention is directed generally to an improved process for the steam reforming of hydrocarbon gas feeds, and specifically to an improved low severity steam reforming process.

2. Description of the Prior Art

Generally, the manufacture of ammonia consists of preparing an ammonia synthesis gas from a nitrogen source, usually air, and from a hydrogen source, which is conventionally either coal, petroleum fractions, or natural gases. For example, in the preparation of ammonia synthesis gas from a light hydrocarbon feedstock, which may range from natural gas to naphtha, the hydrocarbon feedstock gas is first purified by removing gaseous contaminants, such as sulfur (which would poison the downstream catalysts) from the feedstock by the catalytic hydrogenation of the sulfur compounds to hydrogen sulfide and adsorption of the hydrogen sulfide over a zinc oxide adsorption medium. Subsequent steam reforming of the contaminant-free gas provides the major portion of the hydrogen required for ammonia synthesis from the hydrocarbons in the gas. Reforming is accomplished by a two-stage process in which a mixture of steam and the purified feed gas are first reformed over catalyst in a primary reformer, followed by treatment of the partially reformed gas in a secondary reformer to which air is introduced, in order to provide the required amount of $N_2$ for ammonia synthesis. A reformed gas is produced in the secondary reformer having a greater amount of hydrogen and a lesser amount of hydrocarbons. The reaction processes occurring in the reforming of the feedstock gas begin with the breakdown of hydrocarbons to methane, carbon dioxide and carbon monoxide:

$$H_2O + C_nH_{(2n+2)} \rightarrow CH_4 + CO + CO_2 + H_2$$

and end with the reforming of these products by the desired endothermic methane reforming reaction:

$$CH_4 + H_2O \rightarrow CO + 3H_2$$

and by accompanying exothermic reactions:

$$2CH_4 + 7/2\ O_2 \rightarrow CO_2 + CO + 4H_2O$$

$$CO + H_2O \rightarrow CO_2 + H_2$$

$$2H_2 + O_2 \rightarrow 2H_2O$$

$$CO + \tfrac{1}{2} O_2 \rightarrow CO_2$$

The carbon monoxide in the reformed gas is converted to carbon dioxide and additional hydrogen in one or more shift conversion vessels, and the carbon dioxide is removed by scrubbing. Further treatment of the raw synthesis gas by methanation may be used to remove additional carbon dioxide and carbon monoxide from the hydrogen-rich gas, resulting subsequently in an ammonia synthesis gas containing approximately three parts of hydrogen and one part of nitrogen, that is, the 3:1 stoichiometric ratio of hydrogen to nitrogen in ammonia, plus small amounts of inerts such as methane, argon and helium. The ammonia synthesis gas is then converted to ammonia by passing the gas over a catalytic surface based upon metallic iron (conventionally magnetite) which has been promoted with other metallic oxides, and allowing the ammonia to be synthesized according to the following exothermic reaction:

$$N_2 + 3H_2 \rightarrow 2NH_3$$

The effluent from the ammonia reactor, which contains ammonia, unconverted $H_2$ and $N_2$, and gases which are essentially inerts in the ammonia reaction (principally, methane and argon), is then treated for ammonia recovery, and to form a recycle stream containing $H_2$ and $N_2$ which can be returned to the ammonia reactor along with fresh ammonia synthesis gas.

In a conventional steam reforming ammonia process, it is desirable to minimize the amount of unconverted hydrocarbons (methane slippage) leaving the reformers. Methane will concentrate in the feed to the ammonia reactors because $H_2$ and $N_2$ react and are removed as ammonia product, but the major portion of the inerts such as methane is recycled along with the $H_2$ and $N_2$ and remains in the reactor/recycle loop. If inerts buildup were left unchecked, the partial pressure of the reactants (hydrogen and nitrogen) would be reduced to the point where the reaction rate would be uneconomically slow. To prevent this excessive buildup, an inerts purge is generally taken, conventionally going to fuel. Unfortunately, valuable hydrogen (and nitrogen) is lost in the purge, which typically contains only 10-20% inerts. Minimizing reformer methane slippage minimizes this loss, at the expense of higher reformer furnace fuel and investment requirements. Balances among these factors lead to conventional designs having 7-12 dry mole % methane in the primary reformer effluent.

Recent years have seen the development of various schemes for recovering most of the hydrogen from the inerts purge stream. These purge recovery units have been based on cryogenic fractionation, pressure swing adsorption or membrane diffusion. What they all have in common is that they produce two streams: one enriched in hydrogen for recycle back to the ammonia reactor, and one enriched in inerts going to fuel. An alternative approach to minimizing purge hydrogen loss is the Kellogg purge converter scheme, which employs a second ammonia synthesis reactor to recover part of the purge gas hydrogen and nitrogen as ammonia product. Regardless of which approach is used, a purge gas hydrogen recovery unit saves energy by increasing the conversion of feed to product by minimizing the amount of valuable hydrogen downgraded to fuel. In a high energy cost environment, the investment for a purge recovery unit has often been justified on this basis, without significant change to the operating conditions in the reforming section of the plant.

U.S. Pat. No. 3,081,268 (1963) employs an externally fired primary reformer with high excess steam (steam to feed gas carbon mole ratio of 4 to 8) to achieve an exit gas having a temperature of from about 1350° F. to 1650° F. and a pressure of from about 50-200 psi to achieve conversion of 65 to 85% of the feed hydrocarbons to $H_2$ and carbon oxides. This hydrocarbon conversion level is increased further to 95%-99% overall, in a secondary reformer. The secondary reformer effluent is treated in a shift converter for CO removal, cooled and purified to form the synthesis gas to the ammonia reactor.

U.S. Pat. No. 3,442,613 (1969) to C. F. Braun & Company disclose a process wherein excess methane and argon present in the methanator effluent, are removed ahead of the ammonia synthesis reaction zone by cryogenic techniques to form a high purity synthesis gas and to allow minimization of ammonia synthesis loop purge requirements. Related to the Braun patent are B. J. Grotz, *Hydrocarbon Processing*, vol. 46, no. 4, pp. 197-202 (April 1967) and B. J. Grotz, Nitrogen, vol. 100, pp. 71-75 (1976), and U.K. Patent Nos. 1,156,002 and 1,156,003.

In U.S. Pat. No. 3,441,393 (1969) a Pullman process is disclosed wherein the reforming, shift conversion and methanation steps are accomplished such as to form an ammonia synthesis gas and an ammonia reactor effluent gas dilute in $NH_3$ (about 9.7% $NH_3$). A purge gas stream must be taken to avoid inerts build-up, and the inerts level in the recycle stream to the reactor is such that the combined (recycle and fresh syn gas) feed to the reactor has from about 5 to 20 mol. % inerts.

U.S. Pat. No. 3,947,551 (1976) to the Benfield Corporation relates to a process in which the primary and secondary reforming conditions are such that a low methane concentration (about 0.3% $CH_4$) is present in the secondary reformer effluent. Following shift conversion, $CO_2$ removal and methanation, the ammonia synthesis gas is combined with a recycle gas and passed to ammonia synthesis. Published U.K. Patent Application No. 2,017,071A (1979) to Monsanto forms $NH_3$ from an ammonia synthesis gas containing from 2-15 vol. % $CH_4$, and $H_2:N_2$ mole ratios of from 2:1 to 4:1, to form a reactor product gas containing from 10-25% $NH_3$.

U.S. Pat. No. 4,298,588 (1981) to ICI relates to a process wherein primary reforming is accomplished with total steam to carbon ratio of 2.5 to 3.5:1 to form an exit gas (750°-850° C., 30-120 bar) containing at least 10% and not more than 30% $CH_4$, followed by secondary reforming with excess air (above stoichiometric) to provide an effluent gas (950°-1050° C., about 30-120 bar) having from 0.2-10% $CH_4$ and a $H_2:N_2$ mole ratio of from 2.0 to 2.9:1. After shift conversion, $CO_2$ removal and methanation, the resulting fresh synthesis gas (said to contain usually under 1% v/v of methane) is combined with a $H_2$-rich recycle gas stream (at a ratio of recycled gas to fresh gas of 4 to 6) and passed to an ammonia reactor to give an ammonia reactor effluent gas containing 8 to 12 v/v % $NH_3$. After removal of the ammonia product, the remaining gas is partially recycled to the reactor and partially sent to a purge recovery unit for removal of inerts and the excess $N_2$ (above stoichiometric) introduced with the fresh synthesis gas. However, since $H_2$ recovery in conventional purge recovery units is not complete, this process results in a high $H_2$ loss rate due to the need for a high flow rate of gases to be treated in the purge recovery unit.

U.S. Pat. No. 4,213,954 (1980) to ICI employs reforming conditions and gas recycles similar to U.S. Pat. No. 4,298,588.

Published European Application No. 49,967 (1982) to ICI employs an adiabatic primary reforming step at lower primary reformer outlet temperatures (<750° C., e.g., 550°-650° C.) than those in the above discussed U.S. Pat. No. 4,298,588. The primary reformer effluent, containing 25 to 35% $CH_4$, is subjected to secondary reforming with excess air at secondary reformer outlet temperatures of <900° C., to form an outlet gas containing from 1.5-3.0 mol. % $CH_4$ (dry basis) and a low $H_2:N_2$ ratio (1.0-2.5:1), and produce an ammonia reactor effluent gas (after shift conversion, $CO_2$ removal and methanation) having an ammonia content of about 14 mol. % which is passed to ammonia recovery and thence partially to a purge gas recovery unit to form a $H_2$-rich recycle stream. Again, high $H_2$ losses result due to the need to treat a large volume of gases in the purge recovery unit.

Illustrative purge recovery units are discussed in U.K. Patent Nos. 1,057,020; 1,460,681 and 1,274,504; U.K. Patent Application No. 2,030,473A; Russian Pat. No. 486,667 (1973); R. Banks, *Chem. Eng.*, pp. 90-92 (Oct. 10, 1977); A. Haslam, et al., *Hydrocarbon Processing*, pp. 103-106 (January 1976); K. S. Chari, *Chem. Age India*, pp. 283-285 (April 1978), T. Matsuoka, *Chem. Age India*, vol. 30, no. 2, pp. 119-128 (February 1979); and R. L. Shaner, *Chem Eng. Prog.*, pp. 47-52 (May 1978).

SUMMARY OF THE INVENTION

In a process for producing ammonia which comprises: (a) primary catalytically reforming at super atmospheric pressure in a direct-fired primary reforming zone, a hydrocarbon feedstock with steam to produce a gas containing carbon oxides, hydrogen and methane; (b) secondary catalytically reforming the gas from step (a) by introducing air and bringing the mixture towards equilibrium thereby producing a secondary reformer effluent gas containing nitrogen, carbon oxides, hydrogen and a decreased quantity of methane; (c) converting carbon monoxide catalytically with steam to carbon dioxide and hydrogen; (d) removing carbon oxides to give an ammonia synthesis gas comprising nitrogen and hydrogen and compressing said gas to ammonia synthesis pressure; (e) reacting the synthesis gas in an ammonia synthesis zone to produce ammonia and recovering ammonia from the reacted gas to produce an ammonia-depleted gas stream; (f) recycling at least a portion of said ammonia-depleted gas stream to said ammonia synthesis zone; and (g) treating a sidestream of said ammonia-depleted gas to separate a stream enriched in hydrogen and an inerts-enriched gas stream, and returning the enriched hydrogen stream to the ammonia synthesis zone; the improvement which comprises: (i) operating step (b) at a temperature in the outlet gas of not greater than about 1735° F. and with an amount of air sufficient to provide from about 3 to 11 molar % excess $N_2$, and to form a secondary reformer outlet gas containing at least 0.8 vol. % methane; (ii) operating step (e) under conditions sufficient to provide at least 10 vol. % inert gases in said ammonia-depleted gas stream; and (iii) introducing as synthesis gas feed to the ammonia synthesis zone a mixture comprising the synthesis gas formed in step (d) having a methane content of at least about 1.2 mol. % $CH_4$, on a dry basis, the recycled gas produced in step (f) plus the hydrogen-enriched gas stream formed in step (g), whereby the $H_2$ loss from the process with the separated inerts enriched gas stream is minimized.

DETAILED DESCRIPTION OF THE INVENTION

Figure 1:
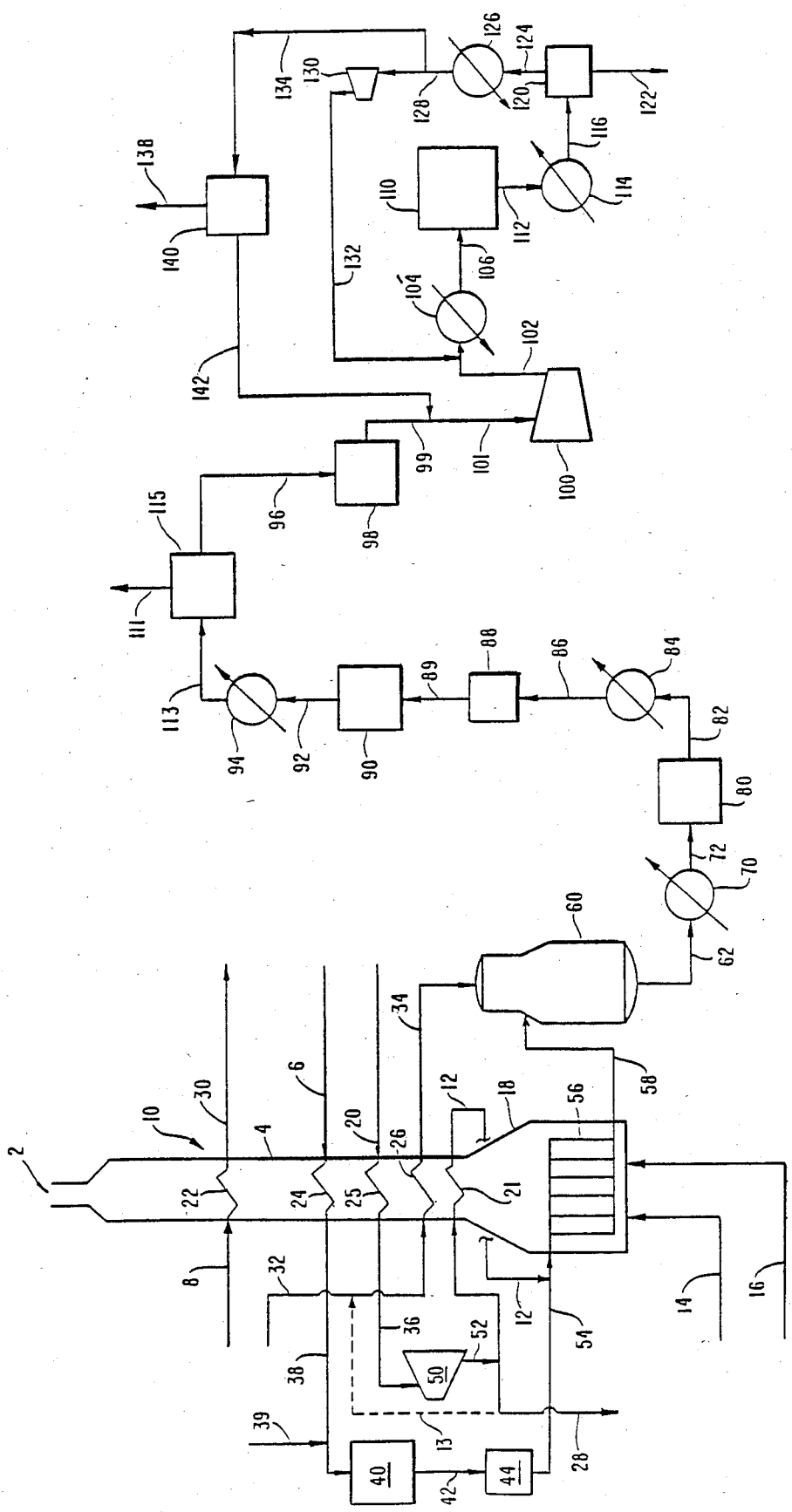
FIG. 1 is a diagrammatic illustration of one embodiment of the process of this invention.

Referring to FIG. 1, there is illustrated a direct fired primary reforming furnace stage generally indicated by the numeral 10, having convection section 4, and primary reforming radiant section 18 heated by burners (not shown, and mounted, for example, in the floor of the radiant section) which are supplied with fuel gas 14 and an oxidant gas (e.g., combustion air) 16 as illustrated. Hot flue gas exiting the radiant section flows through convection section 4, past process steam superheat exchanger 21, process air (which may contain steam and air) heat exchanger 26, power steam superheat exchanger 25, feed gas heat exchanger 24, and boiler feed water preheater 22 and is discharged through stack 2. Therefore, primary reformer 10 is direct fired by means of the combustion of fuel gas 14 and the oxidant gas 16 therein. It will be understood that the direction of flow of the hot combustion gases through primary reformer 10 is not critical, and primary reformer 10 can comprise any conventional primary reformer design, such as is illustrated in U.S. Pat. No. 4,213,954, wherein the combustion gas is passed downwardly from the upper portion of the reformer's radiant section and wherein the convection section is horizontally disposed.

The two-stage reforming process requires the introduction of four separate process streams to the primary reformer: feed gas (for a source of hydrogen), steam, an oxygen-containing gas and fuel gas. In addition, where the process is intended for use in producing an ammonia synthesis gas, a source of nitrogen gas (which is generally air) is generally added to the secondary reforming stage.

Feed gas is introduced into the process via conduit 6 and passes through feed gas heat exchanger 24, positioned in the primary reforming furnace's convection section 4. This preheats the feed gas to approximately 750° F. The gas feedstocks 6 which can be treated in accordance with the process of this invention can vary widely. Suitable feed gases include coke gas or refinery gases, such as are discussed in U.S. Pat. No. 3,649,558, in addition to coal pyrolysis gas, and feedstocks such as those available from intermediate BTU gas (IBG) streams resulting from the gasification of coal or lignite using conventional gasification processes. Also suitable as feeds are natural gas, naphtha, liquefied petroleum gas (LPG), liquefied natural gas (LNG) and the like.

The heated feed gas is withdrawn from exchanger 24 via conduit 38, and may be admixed with a $H_2$ containing gas 39 and contacted at elevated temperatures with a conventional hydrodesulfurization catalyst such as a supported Co-Mo or Ni-Mo hydrodesulfurization catalyst to convert the S compounds in the feed gas to S forms which can be removed in sulfur removal zone 44.

Alternatively, or in addition to hydrodesulfurization zone 40, feed gas 38 can be admixed with sufficient steam to supply the water of reaction required for a subsequent COS hydrolysis reaction if COS is present in the feed. The quantity of steam which is thus introduced can vary widely and will generally comprise from about 2 to 4 vol. %, based on the total feed gas in conduit 38 withdrawn from exchanger 24. The COS reaction can be effected by any conventional means, using conventional hydrolysis catalysts such as activated alumina. In this reactor, COS contained in the feed gas is converted into hydrogen sulfide gas at conventional hydrolysis conditions, which typically range from about 300° to 350° F. and from about 300 to 600 psig.

The gas mixture resulting from the hydrodesulfurization treatment (or from such a COS hydrolysis step) may contain hydrogen sulfide, and is introduced via conduit 42 into sulfur removal zone 44, generally at a gas temperature of from about 600° to 750° F., wherein hydrogen sulfide impurities are removed from the gas stream by conventional technology, such as by use of a zinc oxide adsorption bed. The gas, now essentially free of sulfur impurities (e.g., containing less than about 0.2 ppm by weight of sulfur compounds, calculated as elemental sulfur), is withdrawn via conduit 54 and admixed with steam, which can be accomplished by injecting steam into conduit 54 via conduit 12 and which can comprise at least a portion of steam turbine 50 exhaust. Normally, either the turbine steam exhaust steam 12, is heated before mixing with a desulfurized feedstock gas, or this exhaust steam is first admixed with a feedstock gas and the resulting mixture is heated, before being passed to the primary reforming step. The quantity of steam introduced at this point will generally range from about 2.5 to 5.0 moles of steam per mole of carbon in the desulfurized gas feed. The function of the steam introduced at this point in the process is to provide the water of reaction necessary for the subsequent reforming reactions. The steam/desulfurized gas mixture is then introduced into the tubes 56 of direct fired primary reformer 10 wherein the feed gas is at least partially reformed by contacting the feed gas, under reforming conditions, in tubes 56 with a conventional reforming catalyst. Any conventional primary reforming catalyst can be employed, such as nickel, nickel oxide, chromia, molybdenum, mixtures thereof and the like, with nickel-on-calcium aluminate or nickel-on-alumina being preferred. The temperature within tubes 56 will generally range from about 800° to 1500° F., and preferably from about 1000° to 1450° F., and the pressure will generally range from about 300 to 1000 psig, and preferably from about 450 to 600 psig, and the total gas hourly space velocity in tubes 56 will generally range from about 5000 to 15,000 v/v/hr., with a range of from 6000 to 10,000 v/v/hr. being preferred.

As a result of the reforming reactions occurring in tubes 56 of primary reformer 10, substantially all of the hydrocarbon components of the feed gas (other than methane) are converted to $CH_4$, CO, $CO_2$ and $H_2$; a portion of the original methane component is likewise converted to CO, $CO_2$ and $H_2$; and the temperature of the gas mixture will be generally increased to about 1250° to 1475° F., and preferably from about 1350° to 1450° F. According to the process of this invention, the partially reformed gas 58 will have a residual methane level of at least 13 vol. % $CH_4$, and preferably from about 15 to 20 vol. % $CH_4$, on a dry basis.

The hot combustion gases travel past the exterior of tubes 56 out of radiant section 18 and into convection section 4 wherein the hot gases contact heat exchangers 21, 26, 25, 24, and 22, for recovery of heat by exchange with various streams. The precise number and sequence of the convection section heat exchangers can be chosen using conventional techniques to minimize investment and/or maximize energy recovery. (For example, one or more of the illustrative heat exchangers may be split into separate units in convection section 4 to achieve a more favorable temperature profile.) Boiler feed water 8 is passed through heat exchanger 22 and withdrawn via conduit 30 and can be passed to a steam drum (not shown), from which steam can be withdrawn and passed for superheating through heat exchange with one or more of the secondary reformer effluent 62, high temperature shift effluent 82 or ammonia reactor effluent 112, and then preferably passed via conduit 20 for further superheating in convection section exchanger 25 to achieve a steam temperature of approximately 900° F. This steam is then passed via conduit 36 to turbine 50 to generate work, and the resulting steam from turbine exhaust line 52 is partially withdrawn via conduit 28 and the remainder is passed to heat exchanger 21 for reheating of the exhaust steam to about 1200° F. in indirect heat exchange in convection section 4, and thence to conduit 12. The thus reheated steam is combined with the desulfurized feed gas and fed to catalyst-filled reformer tubes 56 in radiant section 18. A particularly preferred method of forming superheated steam 38 is described in the copending application Ser. No. 550,552 filed Nov. 10, 1983, now U.S. Pat. No. 4,545,976, the disclosure of which is hereby incorporated by reference.

Process air obtained from any convenient source is preheated by passing it to the primary reformer convection section heat exchanger 26 wherein it is heated (generally to a temperature of from about 900° to 1300° F.) by indirect heat exchange with the hot primary reformer convection gas. Prior to or at an intermediate point in the heating process, the process air may be mixed with a portion of turbine exhaust steam 13. The thus-heated process air (with or without admixed steam) is introduced via conduit 34 into secondary reformer 60, together with the partially reformed gas mixture which is introduced via conduit 58.

The quantity of air introduced via conduit 34 is adjusted using conventional control means (not shown), to provide an air:feed ratio sufficient to yield a hydrogen:-nitrogen ratio in the methanator effluent gas 99, of from about 2.7:1 to 2.9:1, that is from about 3 to 11 molar % excess $N_2$. Generally the mole ratio in the secondary reformer effluent gas 62 will range from about 2.0:1 to 2.8:1 $H_2:N_2$, and preferably from about 2.2:1 to 2.6:1 $H_2:N_2$.

Secondary reformer 60 can comprise an adiabatic reformer of conventional design and during steady-state operation achieves further reforming by means of the heat released therein from the exothermic reaction of oxygen with partially reformed feedstock. The amount and type of catalyst in reformer 60 is also conventional, with Ni catalysts supported on alumina being typical. In the process of this invention, the secondary reformer outlet temperature will be less than about 1735° F., and preferably from about 1620° to 1720° F., the secondary reformer outlet pressure will generally range from about 300 to 1000 psig and preferably from about 450 to 600 psig, and a total gas hourly space velocity of from about 6000 to 10,000 v/v/hr will be generally employed.

The secondary reformer effluent gas 62, generally having a residual $CH_4$ level of at least about 0.8 vol. % $CH_4$, and preferably from at least about 1 vol. % up to about 2 vol. % $CH_4$ (on a dry basis), is withdrawn from secondary reformer 60 and passed to heat recovery zone 70, which can comprise a saturated high pressure steam generator, steam superheat exchanger or a combination of one or more such generators and steam superheaters. The resulting partially cooled secondary reformer effluent is withdrawn via conduit 72 and then passed to high temperature shift converter 80, wherein carbon monoxide in the reformer effluent gas is converted over conventional catalysts and using conventional methods and equipment to carbon dioxide and additional hydrogen.

Generally, a temperature of from about 600° to 900° F. and a pressure of from about 300 to 1000 psig will be employed in shift converter 80, and the catalyst will generally comprise a supported, chromium-promoted iron catalyst. Thereafter, gas exiting the high temperature shift converter is withdrawn via conduit 82 and is passed to a heat recovery zone 84, which can include a second steam generator. The partially cooled high temperature shift effluent from zone 84 is fed to low temperature shift converter 90, or preferably first to guard bed 88.

Guard bed 88, which is optional, is preferably employed to treat gas stream 86 upstream of low temperature shift converter 90 to remove halide and sulfur impurities and thereby protect any halide- and sulfur-sensitive catalyst in low temperature shift converter 90. The operation of guard bed 88 and the type of catalyst used therein (e.g., zinc oxide promoted with copper oxide), is conventional, and this step is generally conducted at temperatures and pressures within the ranges used in low temperature shift converter 90 as described below, and the solids employed in guard bed 88 for such halide- and S-impurities removal can comprise the same catalyst as is used in low temperature shift converter 90.

In shift converter 90, a low temperature shift conversion reaction is effected over conventional catalyst using conventional methods and equipment to form additional quantities of $H_2$ and $CO_2$. Generally, a temperature of from about 400° to 500° F. and a pressure of from about 300 to 1000 psig will be employed in converter 90, and the catalyst will generally comprise a mixture of zinc and copper oxides. The effluent gas from low temperature shift converter 90 is then cooled in third heat recovery zone 94 (which can comprise one or more heat exchange vessels), and the cooled, low temperature shift converter effluent gas, now depleted of its heat values, is passed via conduit 113 to $CO_2$-removal zone 115, in which any conventional process (e.g., solvent absorption of $CO_2$ gas) can be used to remove $CO_2$ via conduit 111. The resulting, substantially $CO_2$-free gas is fed by conduit 96 to conventional methanator zone 98 (which normally includes one or more heat exchangers) for removal of additional CO and $CO_2$ and is then withdrawn (via conduit 99) and combined with $H_2$ enriched recycle stream 142 to form stream 101 which is compressed in compressor 100 to ammonia synthesis pressure. The methanator effluent gas 99 in the process of this invention comprises the fresh or "make-up" synthesis gas and is characterized by a $CH_4$ concentration of at least about 1.2 vol. % (dry basis), and preferably from about 1.4 to 2.2 vol. % $CH_4$ (dry basis), prior to the introduction of any recycle gas stream 142.

The pressurized synthesis gas 102 is admixed with recycle stream 132 and preheated in heating zone 104 (which can comprise an indirect heat exchanger in which the hot ammonia reactor effluent gas, or a gas from one or more catalyst stages thereof, is used as the heating medium). The preheated feed gas is then passed via conduit 106 to ammonia reactor 110 wherein $NH_3$ is formed from the generally stoichiometric $H_2/N_2$ in the synthesis gas feed 106 (i.e., about 3:1 $H_2:N_2$ molar ratio) using conventional techniques (i.e., over Fe-catalyst at 600° to 1000° F.). A gaseous ammonia reactor effluent is withdrawn via conduit 112 and cooled in heat recovery zone 114 which can comprise heat exchangers, boilers, and the like, and the cooled ammonia reactor effluent is passed to ammonia recovery zone 120 wherein ammonia product 122 is recovered (e.g., by refrigeration to condense the ammonia therein), thereby forming a gas stream 124 comprising unreacted $N_2$, $H_2$, residual $NH_3$ and inerts to the ammonia reaction (e.g., $CH_4$, Ar, and He), which can be heated in heating zone 126, passed via conduit 128 to circulator 130 and recycled via conduit 132 to the ammonia synthesis reactor feed upstream of feed preheater 104. If desired, the cool recycle gas 124 can be heated by indirect exchange with ammonia reactor effluent gas 112, in which case heater 126 will comprise at least one heat exchanger in heat recovery zone 114. Normally, liquid ammonia stream 122 is flashed (i.e., depressured) to remove dissolved gases ($H_2$, $CH_4$, $N_2$, Ar and He) as a flash gas, which can be passed to fuel use.

It is a feature of this invention that the recycle gas stream 128 and hence recycle gas stream 132, contains inerts ($CH_4$, Ar, and He) in an amount of at least 10 vol. %, and preferably from about 12 to 20 vol. %, and will generally contain $H_2$ and $N_2$ in a mol ratio of from about 2.5 to 3.5 $H_2:N_2$. The volume of recycle gas stream 132 will generally comprise from about 65 to 85 vol. % of the total pressurized gas stream 106, and the recycle gas (stream 132) to fresh feed (stream 102) mole ratio will therefore be at least 2:1, and preferably from about 2.5 to 3.9:1. At least a portion, and generally from about 3 to 4.5 vol. % (and preferably from about 3 to 4.5 vol. %), of the warmed recycle gas 128 is withdrawn via conduit 134 and passed to purge recovery zone 140 wherein the gas is treated to separate an inerts purge stream 138 enriched in $CH_4$ and Ar (which can be used, if desired, as a fuel gas) and to form an $H_2$-enriched gas 142 which is recycled to the ammonia reaction, e.g., by admixing with methanator effluent 99 (which can be accomplished prior, after or during compression in compressors 100). The $H_2:N_2$ mole ratio in recycle stream 142 will generally range from about 5 to 20:1, and preferably from about 7 to 15:1. The volume of the recycle stream 142 will generally be from about 5 to 12 vol. % of the volume of the fresh synthesis gas stream 99.

The manner of operation of $CO_2$ removal zone 115, methanation zone 98, compressor 100 and $NH_3$ synthesis zone 110 can be readily ascertained by one of ordinary skill in the art to achieve the above-described objectives, and need not be more completely described for a full understanding of the process of this invention. The precise operating parameters and equipment of each such process step, therefore, will be readily apparent to one having ordinary skill in the art, and each step can include the usual internal recycle streams and stages found useful in the prior art. Thus, $CO_2$-removal zone 115 can include conventional $CO_2$-absorption and $CO_2$ desorption stages wherein the $CO_2$-laden gas 113 is contacted with a liquid containing either a solvent for, or a dissolved compound (e.g., $K_2CO_3$) readily reactive with, the $CO_2$; the $CO_2$-free gases (generally containing less than about 0.3 vol. % $CO_2$) are withdrawn; and the solvent is treated to desorb the $CO_2$ gases 111 for recycle of solvent to the absorber. Zone 115 can also employ conventional pressure swing adsorption methods for $CO_2$ removal. Exemplary of suitable conventional $CO_2$ removal systems are those discussed in Kirk-Othmer, *Encyclopedia of Chemical Technology*, 3d ed., vol. 2, pp. 492-494 (1978). Similarly, methanator 98 will generally employ a temperature in the range of about 500° to 900° F., a pressure from about 300 to 1000 psig, and a supported Ni catalyst (e.g., Ni on alumina) to convert any remaining CO and $CO_2$ in gas stream 96 to methane, thereby producing an effluent gas 99 containing less than about 10 vppm (i.e., parts per million by volume) of total CO and $CO_2$ and $H_2$ and $N_2$ in a $H_2:N_2$ molar ratio of from about 2.7:1 to 2.9:1. Compression in zone 100 can take place in several stages, as desired, to bring the methanator effluent to synthesis reactor pressure, which generally ranges from about 1500 to 5000 psig. (If desired, compressors 100 can be located upstream of zone 115, to compress the gas prior to treatment in zone 115.) Finally, a conventional dryer unit (not shown) can be employed wherein trace water is removed from the fresh syn gas 99 as required. (If desired, such conventional dryer units can be located to treat stream 101 or at an intermediate point within gas compression zone 100.)

A wide variety of processes can be employed in zone 140 to treat gas stream 134 for removal of inerts and excess $N_2$ (above stoichiometric) as purge via conduit 138. The operation of the purge recovery zone 140 can be easily ascertained by one skilled in the art and forms no part of the present invention. Therefore, suitable purge recovery processes include cryogenic methods, wherein the gas stream 134 is cooled for removal of inerts, such as methane and argon; pressure swing adsorption; and membrane diffusion processes for recovery of a hydrogen-enriched gas stream and separation of the inerts. Suitable are purge recovery processes disclosed in U.K. Patent Nos. 1,057,020; 1,460,681 and 1,274,504; U.K. Patent Application No. 2,030,973A; Russian Patent No. 486,667 (1973); R. Banks, *Chem Eng*, pp 90-92 (Oct. 10, 1977); A. Haslam et al., *Hydrocarbon Processing*, pp. 103-106 (January 1976); K. S. Chari, *Chem. Age India*, p. 283-285 (April 1978); T. Matsuoka, *Chem. Age India*, vol. 30, no. 2, pp. 119-128 (February 1979): and R. L. Shaner, *Chem. Enc. Proc*, pp. 47-52 (May 1978).

The improved process of this invention produces a syn gas 102, having a $H_2:N_2$ molar ratio of about 3:1, that is a $H_2:N_2$ molar ratio of from about 2.6:1 to 3.2:1, and a residual methane concentration (dry basis) of from about 1 to 3 vol. %, and more preferably from about 1.2 to 2.2 vol. %, and which is therefore particularly suitable, after combination with recycle gas stream 132 (to form a combined syn gas reactor feed stream 106 containing preferably from about 7 to 13 vol. % $CH_4$, dry basis), for direct feed to an ammonia synthesis reactor zone 110. Therefore, it is not necessary in the process of this invention to treat gas streams 99, 101 or 102 in a cryogenic purification step to remove excess methane and $N_2$ prior to the ammonia synthesis reaction. (However, if desired, syn gas 101 can be subjected to a cryogenic purification prior to introduction into ammonia synthesis reactor zone 110, for example by use of the cryogenic purification method of U.S. Pat. No. 3,442,613, the disclosure of which is hereby incorporated by reference.)

The improved process of this invention can be further illustrated by reference to the following examples.

EXAMPLE 1

Referring to the process of this invention, as illustrated in FIG. 1, the process is employed to produce 1000 metric tons/day of ammonia using the feedstream and process conditions summarized in Table 1.

The conditions of Example 1 were derived using the following bases, typical of those which would be used in designs of commercial ammonia manufacturing plants: a leak loss allowance of 1 mol. % of gas flow through synthesis gas compressor 100, 64 lb mole/hr of desulfurization hydrogen (stream 39) comprising a sidestream (not shown) taken from the $H_2$-enriched recycle stream 142, and 32 lb mole/hr of hydrogen and 7 lb mole/hr of ammonia in the flash gas going to fuel. (The flash gas is the gas evolved when the liquid ammonia 122, condensed out from ammonia synthesis reactor effluent 116, is depressured to evolve any $H_2$, $N_2$, $CH_4$, Ar and He dissolved therein.) Also, purge hydrogen recovery unit 140 is of a cryogenic type having the following net recoveries of the various feed components (net component recovery is defined as the percentage of a given component in purge 134 recovered in stream 142):

$H_2$: 87.64 mol. %
$N_2$: 25.61
$CH_4$: 3.66
Ar: 15.70
He: 99.00

It should be noted that these net recoveries include a leak loss allowance of 1 mol. % of the purge gas fed to unit 140.

temperature to 1742° F. (vs. 1691° F. in Example 1) can be achieved via an increase in dry process air flow rate of 9.1% (from 3774 lb mole/hr to 4118 lb mole/hr). This also causes the secondary reformer effluent methane content to drop from 1.05% to 0.63% (dry molar basis), and the methanator effluent methane content to drop from 1.78% to 1.26% (dry molar basis). Due to the extra nitrogen being introduced with the additional air, the methanator effluent $H_2/N_2$ ratio drops from 2.82 to 2.60.

The greater degree of feed methane conversion in Comparative Example 2 (i.e., the lower secondary reformer effluent methane content) leads to an increase in the methanator effluent $H_2$ flow of 0.7% (from 8408 lb mole/hr to 8469 lb mole/hr). However, this apparent advantage for Comparative Example 2 over Example 1 is misleading, because the lower methanator $H_2/N_2$ ratio requires that the ammonia synthesis zone employ a substantially higher purge rate to bring the ratio up to the vicinity of the stoichiometric value of 3.0 at the inlet to the ammonia synthesis reactor 110. The higher purge rate in turn substantially increases the loss of $H_2$ to fuel (in stream 138) due to imperfect $H_2$ recovery in purge $H_2$ recovery unit 140. The net effect is that, despite the higher methanator effluent $H_2$, the $H_2$ actually converted to ammonia is lower (8005 lb mole/hr) for Comparative Example 2 than for Example 1 (8102 lb mole/hr). Thus, after accounting for ammonia lost in the flash gas going to fuel, Comparative Example 2 only produces 988 MeT/SD of net ammonia product vs. 1000 MeT/SD for Example 1 with the same feed rate and reformer furnace firing.

TABLE 1

| | Primary Reformer Feed (Stream 54 + 12) | Primary Reformer Effluent (Stream 58) | Air + Steam to Secondary Reformer (Stream 34) | Secondary Reformer Effluent (Stream 62) | Final Synthesis Gas (Stream 99) |
|---|---|---|---|---|---|
| Wet flowrate, mph | 11420.8 | 14308.5 | 5158.2 | 20979.9 | 11640.2 |
| Pressure, psig | 550.0 | 500.0 | 500.0 | 494.0 | 418.0 |
| Temperature, °F. | 1045.0 | 1425.0 | 1200.0 | 1690.7 | 40.0 |
| Composition, dry mol. % | | | | | |
| $CH_4$ | 91.98 | 16.38 | — | 1.05 | 1.73 |
| $C_2H_6$ | 2.35 | — | — | — | — |
| $C_3H_8$ | 1.13 | — | — | — | — |
| $C_4H_{10}$ | 0.49 | — | — | — | — |
| $N_2$ | 1.73 | 0.59 | 78.09 | 23.03 | 25.67 |
| $CO_2$ | 0.34 | 10.94 | 0.03 | 8.77 | — |
| $H_2$ | 1.93 | 64.53 | — | 55.58 | 72.29 |
| Ar | 0.01 | — | 0.93 | 0.27 | 0.30 |
| $O_2$ | — | — | 20.95 | — | — |
| CO | — | 7.55 | — | 11.29 | — |
| He | 0.04 | 0.01 | — | 0.01 | 0.01 |
| Steam/Dry Gas Ratio | 3.264 | 0.820 | 0.367 | 0.614 | 0.0008 |

COMPARATIVE EXAMPLES 2 AND 3

Again, referring to the process illustrated in FIG. 1, a series of cases are exemplified in Table 2, in which a comparison is given between the process of this invention as illustrated in FIG. 1, and Comparative Examples 2 and 3, which progressively illustrate the adverse effects of moving away from this invention by using additional air introduction to the secondary reformer as a means to raise secondary reformer outlet temperature above 1735° F., while correspondingly reducing methanator effluent methane content. Purge recovery unit component recovery fractions were assumed to be the same for each case, as were compressor leak loss, flash gas to fuel and desulfurization hydrogen requirement.

Looking first to Comparative Example 2, Table 2 indicates that an increase in secondary reformer outlet Specifically, Example 2 uses a higher purge rate of 3061 lb mole/hr vs. 1508 lb mole/hr for Example 1 (ammonia-free basis), so that the purge recovery unit product stream 142, containing a high percentage of $H_2$, can blend with stream 99 to achieve a 3.0 $H_2/N_2$ ratio in stream 101 in each Example. A manifestation of the higher purge rate is the greatly reduced inerts content in the purge stream. As indicated in Table 2, the Comparative Example 2 purge contains only 6.6% inerts, vs. a more conventional 15.9% for Example 1 (both values on ammonia-free basis). Thus, it is shown that very low purge inerts contents (i.e., less than 10%) are characteristic of high $H_2$ losses to fuel.

Looking next at Comparative Example 3, Table 2 indicates that a further increase in secondary reformer outlet temperature to 1832° F. can be achieved via an additional 15.4% increase in process air flow rate (to 4700 lb mole/hr); that is a total of 24.5% increase in process air flow rate as compared to Example 1. With this further air rate increase, the secondary reformer effluent methane content drops down to 0.23% (dry molar basis) and the methanator effluent methane content falls to 0.80 dry mole %. The corresponding methanator effluent $H_2/N_2$ ratio is only 2.29.

Comparative Example 3 yields a slight further increase in the $H_2$ flow rate leaving the methanator of 0.2% (to 8486 lb mole/hr). However, as with Comparative Example 2, the net effect is negative, with $H_2$ actually converted to ammonia dropping to only 7736 lb mole/hr, and net ammonia production falling to 955 MeT/SD. Characteristic of the low methanator effluent $H_2/N_2$ ratio and the low net $H_2$ conversion to ammonia, the purge rate is high (5905 lb mole/hr on ammonia-free basis), and purge inerts content is low (2.8% on ammonia-free basis).

In addition, the higher process air flow rates of Comparative Examples 2 and 3 result in an increased consumption of energy in compression of the air, a significant process cost for an ammonia plant.

TABLE 2

| Process Parameter | Stream No. | Example 1 | Comparative Example 2 | Comparative Example 3 |
|---|---|---|---|---|
| Primary Reformer | | | | |
| Inlet Steam/Carbon[1] | 54 + 12 | 3.2 | 3.2 | 3.2 |
| Outlet Temperature, °F. | 58 | 1425 | 1425 | 1425 |
| Outlet Pressure, psig | 58 | 500 | 500 | 500 |
| Outlet $CH_4$ Slip, dry mole % | 58 | 16.4 | 16.4 | 16.4 |
| Secondary Reformer[8] | | | | |
| Dry Air Rate lb mole/hr | 34 | 3774 | 4118 | 4700 |
| Excess Air, mole %[2] | 34 | 6.5 | 15.3 | 31.1 |
| Steam/Dry Air Mole Ratio | 34 | 0.367 | 0.336[5] | 0.294[5] |
| Outlet Temperature, °F. | 62 | 1691 | 1742 | 1832 |
| Outlet Pressure, psig | 62 | 494 | 494 | 494 |
| Outlet $CH_4$ Slip dry mole % | 62 | 1.05 | 0.63 | 0.23 |
| Methanator Effluent | | | | |
| $H_2$ Flow, lb mole/hr | 99 | 8408 | 8469 | 8486 |
| $H_2/N_2$ mole ratio | 99 | 2.82 | 2.60 | 2.29 |
| Outlet $CH_4$ Content, dry mole % | 99 | 1.78 | 1.26 | 0.80 |
| Ammonia Synthesis Loop | | | | |
| Purge rate, lb mole/hr[3] | 134 | 1508 | 3061 | 5905 |
| Purge inerts content, mole %[3] | 134 | 15.9 | 6.6 | 2.8 |
| Unconverted $H_2$, lb mole/hr | 4 | 306 | 464 | 750 |
| $H_2$ converted to $NH_3$, lb mole/hr | 110 | 8102 | 8005 | 7736 |
| $NH_3$ in flash gas to fuel, lb mole/hr | 6 | 7 | 7 | 7 |
| Net $NH_3$ Production, MeT/SD | 7 | 1000 | 988 | 955 |

Notes:
[1]Ratio of moles of steam to moles of hydrocarbon carbon (excludes $CO_2$) in feed gas.
[2]Air in excess of that required to produce a stoichiometric 3.0 $H_2/N_2$ mole ratio in the methanator effluent stream.
[3]Purge rate and purge inerts % are reported on an ammonia-free basis. Inerts are $CH_4$, Ar and He.
[4]Includes synthesis compressor 100 leak loss allowance, desulfurization $H_2$ 39, flash gas $H_2$, purge recovery unit fuel gas product 138 and purge recovery unit leak loww allowance.
[5]Flow of steam in stream 34 held constant at same rate as in Example 1.
[6]Assumes stream 122 is depressured to remove inerts as flash gas.
[7]Ammonia in liquid product stream after flash of stream 122 for removal of inerts.
[8]The temperature of the air/steam mixture 34 going to the secondary reformer was held constant at 1200° F.

Thus, while I have illustrated and described the preferred embodiment of my invention, and have described my invention and the manner and process of making and using it in such full, clear, concise and exact terms as to enable any person skilled in the art to which it pertains to make and use the same, one skilled in the art can easily ascertain the esssential characteristics of this invention and without department from the spirit and scope thereof can make various changes and/or modifications to the invention for adapting it to various usages and conditions. Accordingly, such changes and/or modifications are properly intended to be within the full range of equivalents of the following claims.

What is claimed is:

1. In a process for producing ammonia which comprises:
   (a) primary catalytically reforming at super atmospheric pressure in a direct-fired primary reforming zone, a hydrocarbon feedstock with steam to produce a gas containing carbon oxides, hydrogen and methane;
   (b) secondary catalytically reforming the gas from step (a) by introducing air and bringing the mixture towards equilibrium thereby producing a secondary reformer effluent gas containing nitrogen, carbon oxides, hydrogen and a decreased quantity of methane;
   (c) converting carbon monoxide catalytically with steam to carbon dioxide and hydrogen;
   (d) removing carbon oxides to give an ammonia synthesis gas comprising nitrogen and hydrogen and compressing said gas to ammonia synthesis pressure;
   (e) reacting the synthesis gas in an ammonia synthesis zone to produce ammonia and recovering ammonia from the reacted gas to produce an ammonia-depleted gas stream;
   (f) recycling at least a portion of said ammonia-depleted gas stream to said ammonia synthesis zone; and
   (g) treating a sidestream of said ammonia-depleted gas to separate a stream enriched in hydrogen and an inerts-enriched gas stream, and returning the enriched hydrogen stream to the ammonia synthesis zone;

the improvement which comprises:

(i) operaring step (b) at a temperature in the outlet gas of not greater than about 1735° F. and with an amount of air sufficient to provide from about 3 to 11 molar % excess $N_2$, and to form a secondary reformer outlet gas containing at least 0.8 vol. % methane;

(ii) operating step (e) under conditions sufficient to provide at least 10 volume percent inert gases in said ammonia-depleted gas stream; and (iii) introducing as synthesis gas feed to the ammonia synthesis zone a mixture comprising the synthesis gas formed in step (d) having a methane content of at least about 1.2 mole % $CH_4$, on a dry basis, the recycled gas produced in step (f) plus the hydrogen-enriched gas stream formed in step (g), whereby the $H_2$ loss from the process with the separated inerts-enriched gas stream is minimized.

2. The improved process of claim 1 wherein step (b) is operated at a temperature in the outlet gas of from about 1620° to 1720° F.

3. The improved process of claim 2 wherein step (b) is operated at an outlet gas pressure of from about 400 to 600 psig and wherein the outlet gas of step (b) contains from about 1 to 2 volume percent methane, on a dry basis.

4. The improved process of claim 1 wherein from about 2.5 to 6 volume percent of said ammonia-depleted gas is passed as said sidestream to step (g).

5. The improved process of claim 4 wherein said ammonia-depleted gas stream contains from about 10 to 20 volume percent inerts.

6. The improved process of claim 5 wherein said synthesis gas feed to the ammonia synthesis zone contains from about 7 to 13 volume percent methane.

7. The improved process of claim 1 wherein said ammonia-depleted gas stream contains from about 10 to 20 percent inerts and is characterized by a hydrogen:nitrogen mole ratio of from 2.5 to 3.5:1.

8. The improved process of claim 1 wherein step (a) is operated at an outlet gas temperature of from about 1250° to 1475° F., at a steam to carbon molar ratio of from 2.5 to 5.0:1 and employs an outlet gas methane content of at least about 13 volume percent, on a dry basis.

* * * * *